(12) United States Patent
Laurenzano

(10) Patent No.: US 12,282,616 B2
(45) Date of Patent: Apr. 22, 2025

(54) MULTIPLE OPTICAL-SENSOR POINTING DEVICE SYSTEMS

(71) Applicant: Contour Innovations LLC, Wilmington, DE (US)

(72) Inventor: Marco Vito Maria Laurenzano, Wilmington, DE (US)

(73) Assignee: Contour Innovations LLC, Wilmington, DE (US)

( * ) Notice: Subject to any disclaimer, the term of this patent is extended or adjusted under 35 U.S.C. 154(b) by 0 days.

(21) Appl. No.: 18/262,011

(22) PCT Filed: Jan. 19, 2022

(86) PCT No.: PCT/US2022/012890
§ 371 (c)(1),
(2) Date: Jul. 19, 2023

(87) PCT Pub. No.: WO2022/159434
PCT Pub. Date: Jul. 28, 2022

(65) Prior Publication Data
US 2024/0319805 A1    Sep. 26, 2024

Related U.S. Application Data

(60) Provisional application No. 63/139,105, filed on Jan. 19, 2021.

(51) Int. Cl.
*G06F 3/0362* (2013.01)

(52) U.S. Cl.
CPC .................. *G06F 3/0362* (2013.01)

(58) Field of Classification Search
CPC .. G06F 3/0346; G06F 3/03545; G06F 3/0362; G06F 3/0317; G06F 3/033; G06F 3/0338; G06F 3/03548; G01R 33/07; H03K 17/97; H01H 2019/146

See application file for complete search history.

(56) References Cited

U.S. PATENT DOCUMENTS

| 5,635,926 A | 6/1997 | Li |
| 2011/0134031 A1* | 6/2011 | Wang .................... G06F 3/0304 345/157 |

FOREIGN PATENT DOCUMENTS

| EP | 0382354 A2 | 8/1990 |
| WO | WO 2018/086070 A1 | 5/2018 |

OTHER PUBLICATIONS

International Search Report and Written Opinion of International Searching Authority for International Patent Application No. PCT/US2022/012890, mailed Apr. 8, 2022 (10 pages).

* cited by examiner

*Primary Examiner* — Nelson M Rosario
(74) *Attorney, Agent, or Firm* — Nixon Peabody LLP

(57) ABSTRACT

Aspects discussed herein are directed to ergonomic pointing device systems. In one example, a pointing device system includes an elongate base member, a sleeve disposed to fit over at least a portion of the elongate base member, the sleeve configured to rotate about the elongate base member in a first direction and slide about the elongate base member in a second direction substantially orthogonal to the first direction, and multiple optical sensors disposed within the elongate base member and positioned to detect at least one of a rotational movement of the sleeve relative to the multiple optical sensors and an axial movement of the sleeve relative to the multiple optical sensors.

29 Claims, 12 Drawing Sheets

MULTIPLE OPTICAL-SENSOR POINTING DEVICE SYSTEMS

CROSS-REFERENCE TO RELATED APPLICATIONS

This application is a national stage of International Application No. PCT/US2022/012890, filed Jan. 19, 2022, which claims the benefit of, and priority to, U.S. Provisional Patent Application Ser. No. 63/139,105, filed on Jan. 19, 2021, each of which is hereby incorporated by reference herein in its entirety.

BACKGROUND OF THE DISCLOSURE

In computer systems, a pointing device generally functions by detecting two-dimensional motion relative to its supporting surface. The pointing device may include various user features, such as "wheels" or buttons, which permit a user of the device to perform system-dependent operations. The motion of the pointing device typically translates into the motion of a pointer on a display, which allows for fine control of a Graphical User Interface (GUI). Typical pointing devices utilize a "point and click" sequence of operations where a cursor, once moved to a desired position, performs a click operation responsive to user depression of a button. The computer mouse is one example of such a pointing device. Other known examples can include a trackball, a joystick, or a touchpad.

SUMMARY OF THE DISCLOSURE

Aspects and embodiments discussed herein are directed to a pointing device system that is controllable by a user without requiring unnecessary actions and movements. In particular, various embodiments facilitate the avoidance of harmful movements that may cause injuries or strains to the user. In addition to minimizing strain on the arms, back, shoulders, neck, hands, and wrists of a user, aspects and embodiments of the pointing device systems discussed herein improve the stability, structural integrity, and alignment and precision of pointing device. Aspects and embodiments discussed herein are directed to an improved ergonomic roller mouse pointing device system which is shortened in length, has improved position accuracy, and improved functionality. In addition, aspects and embodiments are directed to a multiple sensor measurement system including multiple optical sensors that can be disposed along any surface (internal or external) of an elongated base member (holder). In particular, aspects and embodiments discussed herein are directed to an ergonomic roller mouse pointing device system having multiple (at least two) optical sensors placed along a surface of the housing (central holder) that are used to detect motion of the outer sleeve moving along and over the optical sensors. In particular, aspects and embodiments provided herein provide an ergonomic roller mouse with multiple optical sensors that results in a holder and an outer sleeve that can be shorter in length, so that the roller mouse device can be smaller, while also providing the roller mouse device that has improved measurement precision and functionality. Various other benefits and advantages of the aspects and embodiments discussed herein are further described with reference to the FIGS.

According to one aspect, there is provided an improved positioning system. In one example, the pointing device system comprises an elongate base member, a sleeve disposed to fit over a portion of the elongate base member, the sleeve configured to rotate about the elongate base member in a first direction and slide about the elongate base member in a second direction substantially orthogonal to the first direction, wherein the sleeve includes a pattern on an inner surface thereof, and multiple optical sensors disposed along a surface of the elongate base member, or within the elongate base member, and positioned to detect at least one of a rotational movement of the sleeve relative to the sensor and an axial movement of the sleeve relative to the sensor based at least in part on a variation of the pattern within a field of view of the multiple optical sensors.

In one example, the pointing device system comprises an elongate base member, a sleeve disposed to fit over a portion of the elongate base member, and at least two optical sensors. The sleeve is configured to rotate about the elongate base member in a first (Y) direction and slide about the elongate base member in a second (X) direction substantially orthogonal to the first direction. The at least two optical sensors are disposed along a surface of the elongate base member and positioned to detect a position reading of the sleeve from at least one of a rotational movement of the sleeve relative to the multiple optical sensors and an axial movement of the sleeve relative to the at least two optical sensors, based at least in part on a variation of at least one signal received by the at least one of the at least two optical sensors signals from an inner surface of the sleeve within a field of view of at least one sensor of the at least two optical sensors.

In one example, the position reading is based on a signal received by only one of the optical sensors.

In one example, the position reading is based on a signal received from an optical sensor covered by the sleeve and the reading from an optical sensor not covered by the sleeve is ignored.

In one example, the at least two optical sensors comprises two optical sensors and the position reading is based on signals received from the two optical sensors. In one example, the position reading is based on an average of the signals from the two optical sensors.

In one example, the position reading is selected from a higher quality of the signals from the two optical sensors.

In one example, the position reading is selected from the sensor that is more likely to be covered based on a determined direction of movement of the sleeve based on signals from the two optical sensors.

In one example, the position reading is selected from a left sensor based on a determination that the sleeve is moving to the left based on signals from the two optical sensors.

In one example, the position reading is selected from a right sensor based on a determination that the sleeve is moving to the right based on signals from the two optical sensors.

In one example, the surface of the elongate base member is an inner surface, the two sensors are disposed along the inner surface and each sensor receives a signal from the inner surface of the sleeve through a respective aperture in the elongate base member.

In one example, the length of the sleeve is at least 2 mm greater than a distance between an end to end spacing between the two optical sensors.

In one example, the length of the sleeve is 10 cm and the distance between the sensors is 7 cm.

In one example, the positioning device is an improved roller mouse pointing device.

In one example, the improved pointing device has at least twice the X-range of a single optical sensor roller mouse pointing device.

In one example, the improved pointing device has improved positioning accuracy relative to a single optical sensor roller mouse pointing device.

In one example, the improved pointing device is smaller than a single optical sensor roller mouse pointing device.

In one example, the improved positioning device further comprises a circuit in communication with the multiple optical sensors that is configured to transmit the detected position reading based on at least one of the rotational movement and the axial movement of the sleeve to a host computer.

In one example, the circuit in communication with the multiple optical sensors communicates with a processor that is configured to effect motion of a pointer in a visual display relative to the detected position reading of at least one of the rotational movement and the axial movement of the sleeve.

According to one aspect, there is provided an improved positioning method. In one example, the method comprises moving a sleeve disposed over a portion of the elongate base member, the sleeve configured to rotate about the elongate base member in a first (Y) direction and slide about the elongate base member in a second (X) direction substantially orthogonal to the first direction, and receiving an optical signal from at least one optical sensor of at least two optical sensors disposed along a surface of the elongate base member from at least one of a rotational movement of the sleeve relative to the at least two optical sensors and axial movement of the sleeve relative to the at least two optical sensors, based at least in part on a variation of the optical signal received by the at least at least one of the at least two optical sensors signals from an inner surface of the sleeve within a field of view of at least one optical sensor of the at least two optical sensors to provide a position reading.

In one example, the position reading is based on a signal received by only one of the at least two optical sensors.

In one example, the position reading is based on a signal received from an optical sensor covered by the sleeve and the reading from an optical sensor not covered by the sleeve is ignored.

In one example, the position reading is based on signals received from two of the at least two optical sensors. In one example, the position reading is based on an average of the signals received from the two optical sensors. In one example, the position reading is selected from a higher quality of the signals from the two optical sensors. In one example, the position reading is selected from a sensor that is more likely to be covered based on a determined direction of movement of the sleeve based on signals from the two optical sensors.

In one example, the position reading is selected from a left sensor based on a determination that the sleeve is moving to the left based on signals from the two optical sensors.

In one example, the position reading is selected from a right sensor based on a determination that the sleeve is moving to the right based on readings from the two optical sensors.

In one example, the position reading is processed to provide an improved roller mouse pointing device.

In one example, the method further comprises transmitting the position reading to a host computer to effect motion of a pointer in a visual display relative to the position reading of at least one of the rotational movement and the axial movement of the sleeve.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION OF THE DISCLOSURE

Figure 1:
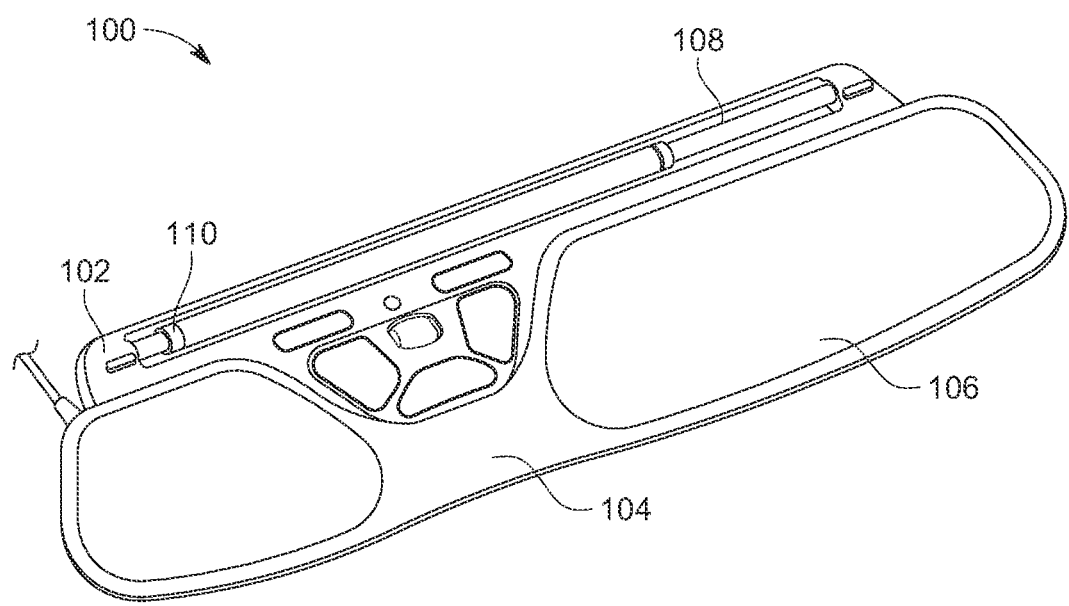
FIG. 1 is an example of a pointing device system according to aspects of the present disclosure.

Conventional pointing devices suffer from a variety of deficiencies, such as ergonomic problems. Often, operation of a conventional pointing device requires an unnecessary amount of open space. Moreover, extended use of certain conventional pointing devices has been known to result in injuries or strains to a user. Accordingly, aspects and embodiments discussed herein reduce the amount of space necessary to operate a pointing device, while also minimizing the strain on the arm, back, shoulders, neck, hands, or wrists, of the user. Various aspects and embodiments of an improved ergonomic roller mouse pointing device discussed herein have therefore been developed as a replacement for a conventional computer mouse.

Aspects and embodiments discussed herein are directed to an improved pointing device system and design. In one example, the pointing device system may include a sleeve which is rotatable and slidable along an elongate base member (also referred to as a "central housing or holder"). The pointing device system includes multiple optical sensors which are positioned to detect the rotation and/or axial movement of the sleeve, and that are configured to communicate with a processor to effect movement of a pointer within a visual display. Specifically, by rotating the sleeve around the elongate base member and sliding it along the elongate base member, a user of the pointing device system may control the x and y coordinates of a pointer location in a Graphical User Interface (GUI) of a computer system to which the pointing device system is connected. According to some examples, although not necessary, the elongate base member may be depressible by the user, permitting the user to perform actions corresponding to conventional mouse clicks. In various examples, although not necessary, the pointing device system may also include, either individually or in any combination, a support assembly, a patterned inner sleeve, a Piezoelectric device, and/or a click pressure adjuster, each of which improve the functionality of the pointing device system, as well as the usability.

Aspects and embodiments discussed herein are directed to an improved ergonomic roller mouse pointing device system which is smaller, has improved position accuracy, and improved functionality when compared to other ergonomic pointing device systems. In addition, aspects and embodiments are directed to a multiple sensor measurement system including multiple optical sensors that can be disposed along any surface (internal or external) of the elongated base member (holder). In particular, aspects and embodiments discussed herein are directed to an ergonomic roller mouse pointing device system having multiple (at least two) optical sensors placed along a surface of the housing (central holder) that are used to detect motion of the outer sleeve moving in the X-Y directions along and over the optical sensors. Some of the advantages resulting from the multiple sensor measurement system are that the outer sleeve disposed around the holder can be shorter in length, the central housing (holder) can be shortened in length, the overall roller mouse device can be smaller, while also having the added advantages that the roller mouse device also has improved X-Y position accuracy and improved functionality such as a greater range of motion, for example in the X-direction. Another advantage of the multiple sensor measurement system is that is enables a miniature version of the roller mouse device with a small central holder and a small outer sleeve.

Another aspect of the multiple sensor technology system is software and/or firmware functionality that handles any handover between the multiple optical sensors. Another aspect of the multiple sensor technology system is that can be used for any device or application that has a sliding surface of limited range, and it is not just limited to pointing devices. Another aspect of the multiple sensor technology system is that it can be used with any roller mouse system that has inner optical sensors (internal to the holder) or outer optical sensors (external to the holder). Another aspect of the multiple sensor technology system is that provides for more accurate reconstruction of the absolute position of the outer sleeve along its X-Y range which can be translated to the pointer in a display. Another aspect of the multiple sensor technology system is that the more optical sensors that are used, the more accurate the positioning measurement can be. Another aspect of the multiple sensor technology system and the improved ergonomic roller mouse pointing device system is that with a shorter sleeve, the range of motion of the pointing device in the X-direction can be doubled as compared to a single optical sensor system, which enables, for example: left to right movement between multiple monitors (i.e. dual monitor applications) without being limited by end detection of the sleeve in the X-direction along the holder; in a single monitor environment enables double X to Y movement of the pointing device so that a user rarely or never hits the end of the X movement range of the pointing device, which minimizes the need for and/or simplifies the end detection needed. Various other benefits and advantages of the aspects and embodiments discussed herein are further described with reference to the FIGS.

It is to be appreciated that embodiments of the systems and apparatuses discussed herein are not limited in application to the details of construction and the arrangement of components set forth in the following description or illustrated in the accompanying drawings. The systems and apparatuses are capable of implementation in other embodiments and of being practiced or of being carried out in various ways. Examples of specific implementations and combinations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Turning to FIG. 1, a first example of a pointing device system 100 is shown. In one implementation, the pointing device system 100 can include a device case 102. The device case 102 secures and protects additional parts and components of the pointing device system 100. FIG. 1 illustrates the pointing device system 100 as having a device case 102 including a removable wrist rest 104. The wrist rest 104 may have one or more cushions 106 to improve wrist positioning of a user of the pointing device 100. The pointing device system also includes an elongate base member 108 and a sleeve 110.

Figure 2:
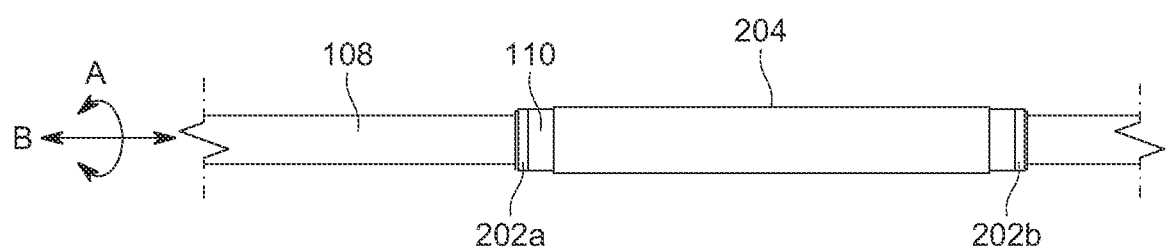
FIG. 2 illustrates one example of the elongate base member and the sleeve of the pointing device system illustrated in FIG. 1, according to aspects of the present disclosure.

Referring to FIGS. 1-2, in various examples, the pointing device system 100 includes an elongate base member 108 ("base member" or "central housing" or "holder") and a sleeve 110. The sleeve is be disposed to fit over a portion of the base member 108, which in certain instances may include a hollow tube. As illustrated in the example of FIG. 1, in certain instances the base member 108 may extend coaxially through a center of the sleeve 110 such that the sleeve 110 may rotate about the base member 108 in a first (Y) direction (illustrated as direction A), and translate (e.g., slide) along the base member 108 in a substantially orthogonal second (X) direction (illustrated as direction B). For the purpose of illustration, arrow indicator A represents the first (Y) direction about which the sleeve 110 is configured to rotate, and arrow indicator B represents the second (X) direction about which the sleeve 110 is configured to slide. As shown, in this example, the device case 102 partially exposes the sleeve 110 and elongate base member 108 so as to make them accessible to a user of the pointing device system 100. In various embodiments, the sleeve 110 can include a tactile material disposed on an outside surface of the sleeve 110, such as a grip 204. The sleeve 110 may also be flexible and composed of one of plastic, cloth, paper, rubber, or other material. In certain embodiments, the sleeve 110 may be composed of a rigid material, and in particular, may take the shape of the elongate base member 108 (e.g., shown as a substantially cylindrical shape). However, in certain other examples the sleeve 110 may have a shape that is substantially different from a shape of the elongate base member 108. In certain embodiments, the sleeve may be flexible and loosely fit over the central housing so that it need not take the shape of the elongate base member.

The system 100 includes an optical sensor system that includes multiple optical sensors that can be either disposed internal to the holder or external to the holder. In certain embodiments, the multiple optical sensors are disposed within the elongate base member 108 to detect at least one of the rotational movement and the axial movement of the sleeve 110. In the illustrated example, one or more switches are included within the case 102 of the pointing device system 100 and are positioned to detect a depression of the sleeve 110 (and/or the elongate base member 108) and initiate an action referred to herein as a "click operation" or "mouse click". For instance, the system 100 may include a click trigger switch positioned so as to activate responsive to an application of downward pressure to the sleeve 110. In various embodiments, the device case 102 also includes a cover which surrounds portions of the inner components of the device case 102, such as the click trigger switch, and protects the components from dust, dirt, moisture, and etc.

In certain examples, the sleeve 110 may also include indicia printed on an outside surface thereof, and may be replaceable with a second sleeve by the user. As illustrated, in various embodiments, the sleeve 110 is supported on the elongate base member 108 by one or more bushings 202a, 202b that allow fluid rotation and sliding about the base member 108. Although the base member 108 and sleeve 110 are shown as including a generally tubular shape, in various additional embodiments, the base member 108 and sleeve 110 could include shapes having a generally non-circular cross-section, a cross-section having at least one flat surface and at least one curved surface, or a cross section having at least three rounded corners. The base member 108 may be composed of any durable material, such as aluminum. In various embodiments, the base member 108 is chosen to have a low coefficient of static friction between the base member 108 and sleeve 110 to provide fluid movement of the sleeve 110 about the base member 108.

Figure 3:
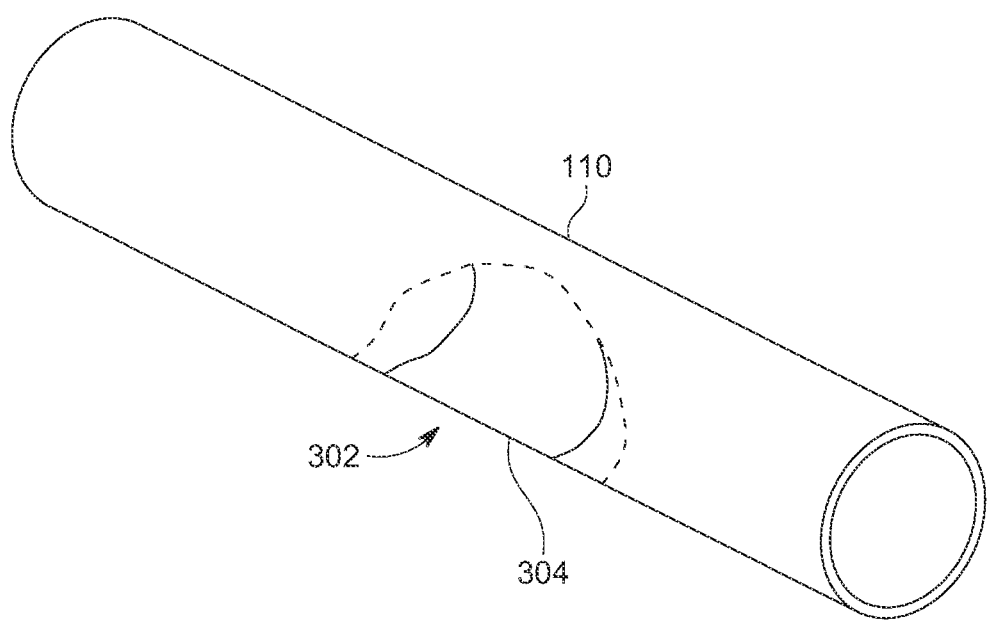
FIG. 3 is a cut-away view of the sleeve of the pointing device system illustrated in FIG. 1, according to aspects of the present disclosure.

Referring now to FIG. 3, one example of the sleeve 110 is illustrated. In particular, FIG. 3 illustrates a cut-away 302 of the sleeve 110 in which an inside (i.e., interior) surface of the sleeve 110 is viewable. As shown, in various examples the sleeve 110 includes a pattern 304 on the inside surface thereof. The pattern 304 may be printed, adhered, or otherwise formed on the inside surface of the sleeve 110. The pattern 304 may include a color pattern, a texture pattern, and/or any regular or irregular design on the inside surface. In specific examples, the pattern 304 may be positioned within a field of view of multiple optical sensors of the pointing device system 100 such that the multiple optical sensors may detect at least one of a rotational movement and an axial movement of the sleeve 110, relative to each optical sensor (and to the elongate base member 108), based on a variation in the pattern 304 within the field of view. As discussed herein in certain examples, a variation in the pattern 304 may include movement of the pattern 304 relative to the optical sensors.

Figure 4:
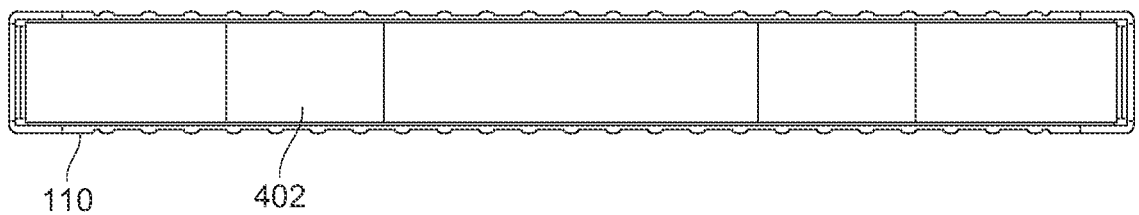
FIG. 4 is one example of a pattern that may be applied to the inside surface of a sleeve, according to aspects of the present disclosure.

Referring now to FIG. 4, illustrated is one example of a pattern 402 that may be applied to the inside surface of the sleeve 110 shown in FIG. 1. Specifically, FIG. 4 illustrates one example of an alternating color pattern. The pattern extends along a length of the sleeve 110 (e.g., in the second direction B) and includes a plurality of alternating black cylindrical sections. While in the example of FIG. 4 the pattern 402 is shown as including alternating black cylindrical sections, other colors and shapes may be used in various other implementations. In one example, the pattern 402 may be divided into a plurality of zones, each zone corresponding to a function to be performed by a processor in communication with the multiple optical sensors. For example, the zones may correspond to and be used for any or all of increase or decrease of speed of movement of the pointer, proximity of an end of the sleeve to an end of the holder (end detection of the sleeve). For example, the system can provide for end detection begins when the sleeve 110 reaches an end of the elongate base member 108. Once detected, the system 100 prompts the processor to automatically move a location of the pointer in the visual display in a corresponding direction continuously until the sleeve 110 is removed from the end of the elongate base member 108. In certain other examples, detection of a certain zone by the optical sensors may alternatively prompt the processor to enter a "scroll" mode of operation. During the "scroll" mode, the user may rotate the sleeve 110 about the base member 108 to perform scrolling actions on information presented in the visual display, the pointing device system 100 may also provide functionality for any or all of cursor end avoidance, or cursor auto centering.

However, in certain other examples, the pointing device system 100 may include one or more additional sensors to detect the movement of the sleeve 110. For instance, the system 100 may include one or more linear Hall effect sensors which are positioned to monitor the momentary position of the sleeve 110 relative to the end of the elongate base member 108. For instance, the system 100 may include a first linear Hall effect sensor positioned at a first end of the elongate base member 108 and a second linear Hall effect sensor positioned at a distal second end of the elongate base member. Each linear Hall effect sensor may interact with a corresponding magnet to determine the proximity of the sleeve to the corresponding end of the sleeve. Once a predetermined threshold between the linear Hall effect sensor and corresponding magnet is reached (i.e., the magnet and the linear Hall effect sensor reach a predetermined proximity), the processor may be prompted to enter a "scroll" mode and/or perform one or more end detection operations, as further discussed herein.

Figure 5A:
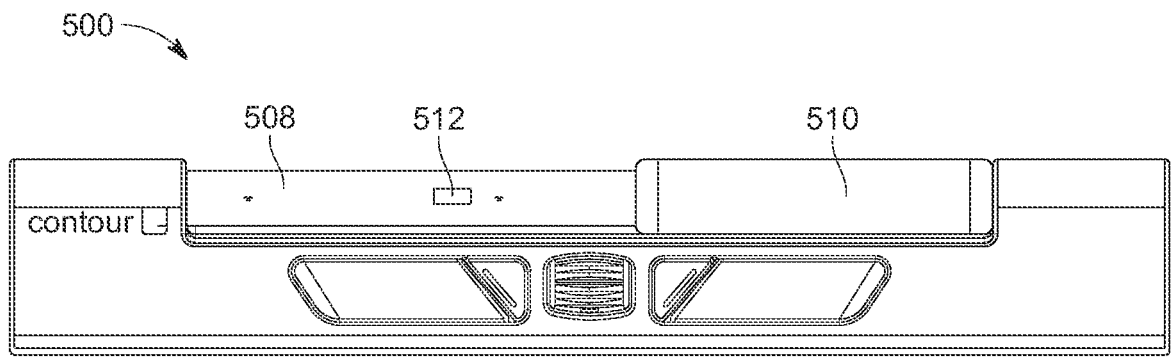
FIGS. 5A-5C illustrate one embodiment of a multiple sensor system including multiples optical sensors disposed along the length of an elongated holder and different positions of the outer sleeve with respect to the multiple optical sensors.
Figure 5B:
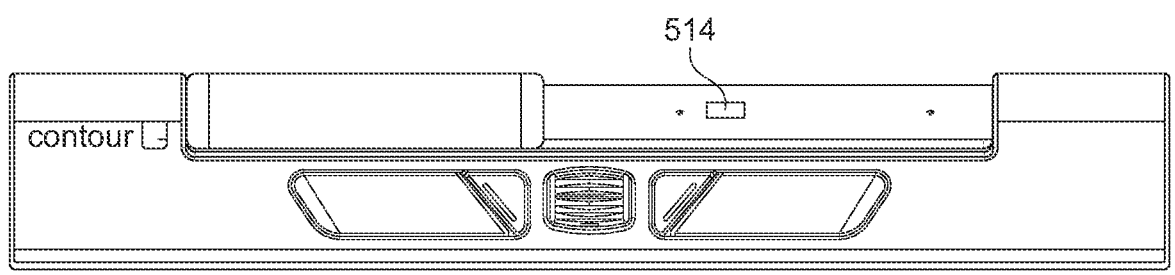
Figure 5C:
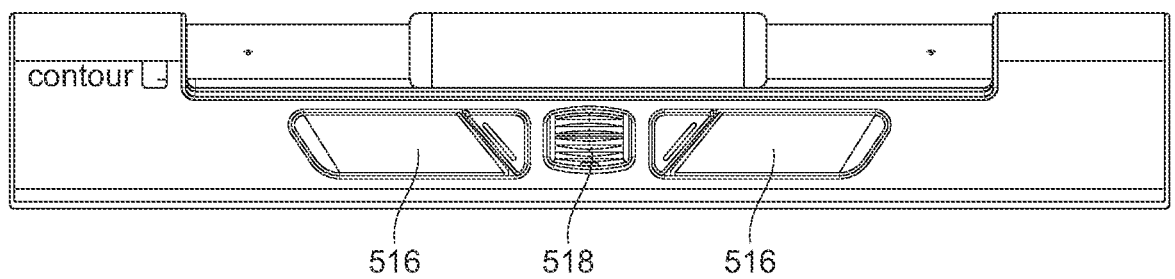

As noted, according to aspects of this disclosure, the elongate base member includes multiple optical sensors disposed on a surface of the elongate base member. Referring now to FIGS. 5A-5C, in certain examples, the multiple optical sensors 512, 514 are disposed within the elongate base member 508 (i.e. are inner-optical sensors). The optical sensors 512, 514 may be positioned to detect the rotational movement and/or axial movement of the sleeve 510 through a respective aperture in the elongate base member 508. In order to detect motion of the sleeve 510, the optical sensor that is detecting the motion has to be covered at all times by the inner surface of the sleeve 510 that it is detecting light from. Accordingly, the sleeve 510 of the improved roller mouse device has to at least always be covering a respective aperture of at least one optical sensor 512, 514. In a single sensor roller mouse device, as in known in the art, the optimal position of the single optical sensor is at the center of the elongate holder and the sleeve typically has a length of at least half (typically slightly more) of the length of the elongate holder. However, a problem with such an arrangement is that the range of motion of the sleeve and thus of the pointing device is limited to half the size of the elongate holder of the roller mouse device. In contrast, with a multiple optical sensor system 500 according to aspects of this disclosure, the optical sensors 512, 514 and their respective apertures are spaced apart along the length of the elongate holder 508 and the sleeve has a length that is long enough to cover both sensor 512, 514 as shown in FIG. 5C, but need not cover both sensors 512, 514 at all times, such as shown in FIGS. 5A, 5B. By way of example, as illustrated in FIGS. 5A-5C, the sensors 512, 514 and the respective apertures may be equally spaced apart at approximately ⅓ and ⅔ of the length of the elongate holder. According to aspects and embodiments, the sleeve 510 has a length having a minimum overlap over the sensors 512, 514 having a lower bound value that is determined by a maximum speed of physical motion that the roller mouse system is designed to accommodate and also a maximum sampling rate of the system. By way of example only and in no way the only sizes, in one embodiment, the sensors 512, 514 and respective apertures are placed 7 cm apart along the length of the holder and the sleeve length is 10 cm. This arrangement is designed for a sampling rate to be as little as 1 ms. With such an arrangement, the resulting minimum overlap of the sleeve is at least a minimum of a few millimeters. By making the sleeve with a length to have an overlap of in a range of at least a few millimeters up to 3 cm, there is provided an improved roller mouse system that allows for a reasonable margin to account for loss of tracking of the sleeve and other potential issues. One advantage of such an arrangement according to aspects of this disclosure is that the size of at least the sleeve 510 as well as the size of the elongate holder 508 can be reduced can be reduced.

It is appreciated that the multiple sensors 512, 514 need not be limited to two optical sensors, it could be more than two optical sensors, and also that the respective apertures need not be position at ⅓ and ⅔ of the length of the elongate holder. The length of the sleeve 510 and the position of the multiple optical sensors 512, 514 and respective apertures can be positioned along the central holder so that, at any point in time, at least one of the optical sensors 512, 514 and respective apertures will be covered by the sleeve 510. Accordingly, according to aspects and embodiments disclosed herein, the sleeve need only be slightly longer than a maximum distance between two contiguous optical sensors of multiple optical sensors to allow seamless hand-over between the two optical sensors. It is also appreciated, according to aspects and embodiments, that inner-optical sensors may further detect proximity of the sleeve 510 to one or more ends of the elongate base member 108. Accordingly, in certain examples the pointing device system 500 may include multiple optical sensors that detect all movements of the sleeve 510 (e.g., rotational, axial, and end detection). For embodiments that include optical sensors that are positioned at an end of the elongate holder and are used, for example, to detect end detection, the sleeve need only be longer than a greater of the two of a maximum distance between two contiguous optical sensors of multiple optical sensors along the length of the holder and the distance between an optical sensors along the length of the holder and an optical sensor the end of the holder used for end of the end of range of motion detection. Each of these arrangements provide the benefits of a roller mouse device having improved efficiency, improved position accuracy, and reduced size and complexity when compared to other pointing devices.

Figure 6:
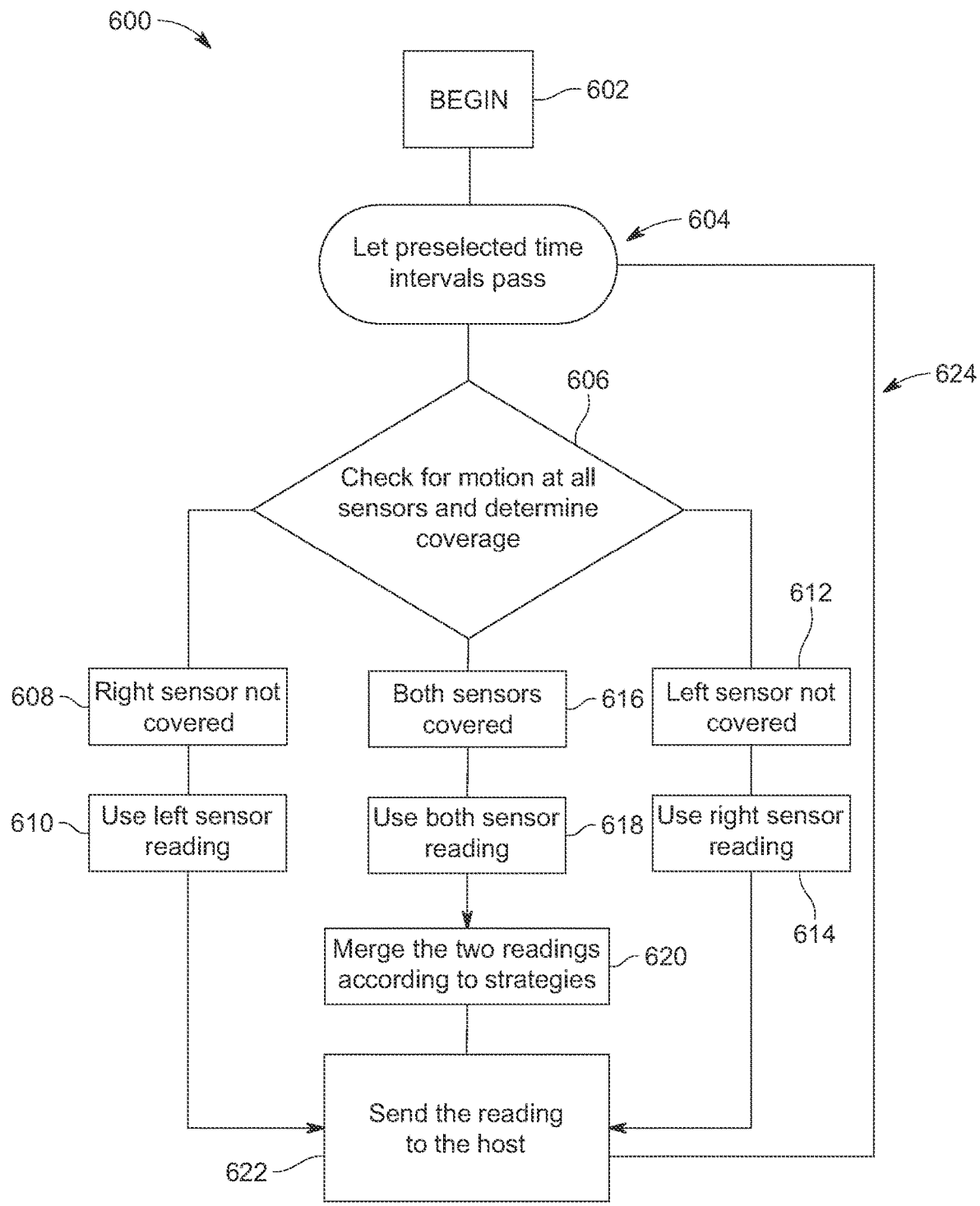
FIG. 6. Illustrates an example of a process for determining any handover between readings from the multiple optical sensors.

Another aspect of the improved roller mouse pointing device and multiple sensor technology system is sensor detection and handover functionality that handles any handover between readings from the multiple optical sensors. Referring to FIG. 6 there is illustrated a flowchart of the multiple sensor handover functionality according to aspects and embodiments of this disclosure. The functionality can be implemented, for example, in software and/or firmware. Generally, the system periodically monitors the motion of the sleeve as detected by the multiple sensors and the coverage state of the multiple sensors, and uses the information to accurately determine the X-Y motion of the sleeve and translate it to motion of a cursor. Generally, each optical sensor is determined at a snapshot in time to have a logical state that is considered either "covered" or "not covered". If the logical state is covered, then the sensor is considered active and information is collected from that. If the sensor is considered "not covered", the information from that sensor is ignored. If more than one sensor is covered, the detected X motion resulting from the sensor readings is a combination of all the readings according to multiple strategies. According to aspects and embodiments, the information from the multiple sensors can be used according to a plurality of possible strategies:

1. Monitor the quality of the readings from each sensor and use only the reading with the highest quality;
2. Use the reading from each sensor and determine an average of the readings; or
3. Based on the direction of motion the sleeve as determined by the sensor readings, select the reading from the sensor that is most likely to be covered (less likely to be uncovered). In particular, the information from the left sensor is used when the motion is above a certain speed in the direction toward the left sensor. In the region of the sleeve where both the sensors are considered covered by the sleeve, the information from the right sensor is used if the motion of the sleeve is determined to be toward the right. To determine which direction the sleeve is moving and which sensor information to pick, an average of the two sensors motion is determined. For example, looking at FIG. 5C, if the sleeve is moving toward the right, the reading is taken from sensor 514 as it will be most active during the sleeve motion. Likewise, if the sleeve is moving toward the left, the X-direction reading will be taken from the left sensor 512.

The process for determining any handover between readings from the multiple optical sensors will now be described with respect to FIG. 6. The process begins at 602. A preselected time interval is allowed to pass at 604 before readings are taken at the multiple sensors. After the time interval, measurements are taken at both sensors 606 and from these measurements it is determined whether each sensor is considered covered or uncovered. If the right sensor is determined to be uncovered 608, then the reading from the left sensor is used 610 to determine X-Y position. If the left sensor is determined to be uncovered 612, then the reading from the right sensor is used 614 to determine X-Y position. If both sensors are considered to be covered 616, then the reading from both sensors are used 618 according to the any of the multiple strategies disclosed herein 620. The ultimate reading is then sent to the host computer 622 to be translated into X-Y pointer movement. The process then repeats 624. Another aspect to the seamless hand-over between the sensors is the ability to correlate the simultaneity of readings. Since there is no shared time base between sensors, a time division approach is used. In particular, readings in the same time slot are considered to refer to the same sample snapshot in time of the motion of the sleeve.

It is appreciated that the herein described functionality and methodologies can be applied to an arbitrary number of sensors. Accordingly, it is appreciated that although there is illustrated an example of a multiple sensor subsystem having only two sensors, in other devices the herein described functionality and methodologies can be used with a roller mouse pointing device having more than two optical sensors. An advantage of such an arrangement is that the length of the sleeve and elongated holder can be reduced even more than with a device using two sensors, while also providing all of the additional advantages noted herein.

Figure 7:
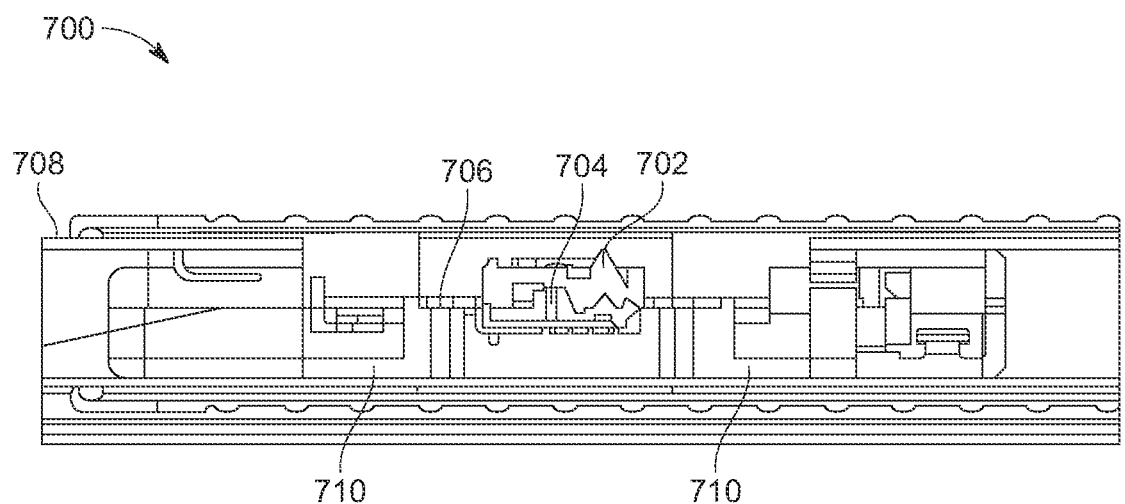
FIG. 7 is an enhanced view of an inner-sensor, according to aspects of the present disclosure.

In certain examples, each optical sensor 512, 514 is a laser sensor that emits and detects light through a respective aperture in the elongated holder 508. Each optical sensor detects movement of the sleeve 510 relative to the elongated holder 508 based at least in part on a variation in the pattern on the inside surface of the sleeve 510 during movement of the sleeve 510. FIG. 7 shows an enhanced cross-sectional view of one example of an inner-optical sensor 702 that can be used for the multiple optical sensors 512, 514 (See FIG. 5) and positioned within an elongate base member 708. The inner-optical sensor 702 may be mounted to a sensor housing 704, which is attached to a sensor circuit board 706 within the elongate base member 710 or on a surface of the elongate base member 710. While in one example the inner-optical sensor 702 includes a laser sensor, in other examples any suitable type of sensor may be used, such as any other suitable optical sensor. In one example, the inner-optical sensor 702 provides light to, and detects light reflected from, the inside surface of the sleeve (e.g., sleeve 510 of FIG. 5). Movement of the sleeve varies the pattern in the field of view of the inner-optical sensor 702, and the characteristics of light reflected from the inside surface of the sleeve. A sensor support 710 secures the sensor circuit board 706, and the inner-optical sensor 702, within the elongate base member 708. In various examples, the elongate base member 708 has a respective aperture through which the optical sensor 702 is in optical contact with the inside surface of the sleeve. Movements detected by the optical sensors 512, 514 (See FIG. 5) are communicated to other system components (e.g., a processor in communication with the pointing device system) through at least the sensor circuit board 706. While in one example the pattern on the inside surface of the sleeve may facilitate end proximity detection, in certain other examples, the corresponding pointing device system 600 may also (or alternatively) include one or more end-detection sensors, such as additional optical sensors, hall effect sensors, and contact switches as have been disclosed herein. In addition, it appreciated that with multiple sensors that provide a precision X-Y measurement, there may also be a need for no end detection. In particular, with multiple sensors providing position information, having the "loss of coverage" of sensor information, coupled with the length of the bar and the spacing of the sensors information, the arrangement allows a more accurate reconstruction of the absolute position of the sleeve along its range. The more sensors that are used the more accurate it is. Thus, it may not even be necessary to provide for end detection, thereby further simplifying the pointing device. So another aspect and advantage of this arrangement is to provide an absolute position reconstruction of the outer sleeve based entirely on the motion sensors available. This is relevant not only for end detection but also for using the device in applications where it's desired to map the absolute X position of the sleeve to some controlled element on the host.

Referring again to FIG. 5, among other components, FIG. 5 shows the system 500 also includes one or more buttons 516 having corresponding switches (not illustrated), and a scroll wheel 518. Activation of any one of the one or more buttons 516, and scroll wheel 518 permits the user to perform a function generally performed by a conventional mouse. For example, each button 516 may have a corresponding switch, which when pressed may represent an action, such as Copy, Paste, Right click, Left click, or Double click. Depression of a corresponding button may activate the corresponding switch and generate a signal to perform the given action. Each button 516 may additionally provide audio feedback (e.g., a click sound) to indicate to the user that the corresponding action has occurred. Each of the illustrated buttons may be independently programmable and may be assigned an action based on user preference. It is also to be understood that while described as each button may be individually configured to perform Copy, Paste, Right click, Left click, or Double click functions, in various further embodiments, the plurality of buttons 516 may also be configurable by the user to perform a user defined function.

As discussed above, various embodiments of the pointing device system 500 may be configured to communicate with a computer system, or similar device, and translate the motion of the sleeve 510 relative to the elongate base member 508 into motion of a pointer on the visual display of the computer system. For example, communication may include communication through the wired connection (not illustrated), which may include a cable, for example. However, in various additional embodiments, the pointing device system 500 is characterized by the absence of a wired connection to the corresponding computer system. That is, the wired connection may be replaced with a wireless connection. Generally, the replacement of wires connecting the pointing device system 500 and computer system with a wireless transmitter/receiver further improves the ergonomics of the pointing device system 500 and removes obstructions from the workspace of the user.

In certain embodiments a circuit board (not illustrated) can also be disposed within the sensor housing. For instance, the circuit board may be coupled and in communication with multiple optical sensors (e.g., via the sensor circuit board), one or more switches, a click trigger, and one or more other components of the pointing device system. In particular, the circuit board may be configured to transmit and receive data with the processor of a computer system responsive to detected movement of a sleeve about the elongate base member. Various components of the pointing device systems discussed herein are mounted to either a single common printed circuit board, or distributed among more than one printed circuit board. The circuit board may be secured to the device case via one or more fasteners (e.g., screws). The circuit board may include a transmitter circuit including a wireless transmitter/receiver for wireless communication with a wireless transmitter/receiver at the computer system. For example, the transmitter can include a radio frequency (RF) transmitter, which can for example be in the form of a USB type device that can be connected to a USB port. A controller is electrically connected to, or otherwise associated with, the transmitter, and causes transmission of data regarding the detected rotations and translations of the sleeve 510. Transmitted motion of the sleeve 510 is translated by computer interface circuitry to cursor control signals for the visual display. The transmitter encodes and transmits information including movement of the sleeve 510 about the base member 508, click operations, scroll wheel and button activation. The receiver is configured to accept the transmission and responsively decode the information. In various embodiments, the receiver is configured to plug-in to a peripheral mouse input of the computer system. To minimize interference, the transmitter and receiver of one embodiment may be configured to operate at a frequency of 2.4 GHz. It is also appreciated that various embodiments may use BLUETOOTH® transmitter/receiver, or any other wireless signal transmitter/receiver as used in the art, to communicate between the pointing device system 500 and the computer system. As used herein, BLUETOOTH® refers to a short range ad hock network, otherwise known as piconet.

In various embodiments, the circuit board further includes a universal serial bus (USB) circuit configured to supply power provided by a USB cable to the power source. In certain embodiments, the pointing device system 500 may also be configured to communicate with the computer system via the USB cable. For example, the pointing device system 500 may be configured to transmit information, such as detected sleeve 510 movement and click operations, to the computer system via the cable. Accordingly, the USB circuit may be in selective communication with the circuit board and various other system 500 components, such as the sensor circuit board. In various embodiments, the USB cable is removable and the pointing device system 500 is configured to be free of all wired connections to the computer system.

While not explicitly illustrated in FIG. 5, the pointing device 500 may also include a rechargeable power source. In various embodiments, the rechargeable power source includes a rechargeable battery. The power source is in electrical communication with, and configured to provide electrical power to, components disposed on the circuit board and the sensor circuit board. For example, the rechargeable power source of one example may include a rechargeable lithium-ion (LiOn) battery. In various examples, the pointing device system 100, 500 may communicate with the processor of a computer system, such as a desktop computer. There are many examples of computer systems that the improved pointing device system can be used with. By way of example but not limited thereto, these examples include, among others, network appliances, personal computers, workstations, mainframes, networked clients, servers, media servers, application servers, database servers, and web servers. Other examples of computer systems may include mobile computer systems (e.g., smart phones, tablet computers, laptop computers, and personal digital assistants) and network equipment (e.g., load balancers, routers, and switches). Examples of particular models of mobile computer systems include iPhones, iPads, and iPod touches running iOS operating system available from Apple, Android devices like Samsung Galaxy Series, LG Nexus, and Motorola Droid X, Blackberry devices available from Blackberry Limited, and Areas Phone devices.

The computer system of various embodiments may include a processor, a memory, an interconnection element, an interface, and data storage element. To implement at least some of the aspects, functions, and processes disclosed herein, the processor performs a series of instructions that result in manipulated data. The processor may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor is connected to other system components, including one or more memory devices, by the interconnection element.

The memory stores programs (e.g., sequences of instructions coded to be executable by the processor) and data during operation of the computer system. Thus, the memory may be a relatively high performance, volatile, random access memory such as a dynamic random access memory ("DRAM") or static memory ("SRAM"). However, the memory may include any device for storing data, such as a disk drive or other nonvolatile storage device.

Components of the computer system are coupled by an interconnection element. The interconnection element enables communications, including instructions and data, to be exchanged between system components of the computer system. The computer system also includes one or more interface devices such as input devices, output devices and combination input/output devices. Interface devices may receive input or provide output. More particularly, output devices may render information for external presentation. Input devices may accept information from external sources, such as various embodiments of the ergonomic pointing device described herein. The input devices may be wireless and the ergonomic pointing device system may communicate via a wireless signal, such as BLUETOOTH®, to the computer system.

The data storage element includes a computer readable and writeable nonvolatile, or non-transitory, data storage medium in which instructions are stored that define a program or other object that is executed by the processor. The data storage element also may include information that is recorded, on or in, the medium, and that is processed by the processor during execution of the program.

While FIGS. 1-7 illustrate some examples of an improved pointing device system having a multiple optical sensors subsystem, and other components thereof, aspects of the disclosure should not be limited to those specific examples discussed with reference to FIGS. 1-7. Various modifications and variations may become apparent in light of the above teachings. For example, FIGS. 8-12 each illustrate different pointing device system arrangements, in which the multiple optical sensors subsystem of this disclosure may be incorporated. Moreover, various aspects of the pointing device system arrangements illustrated in FIGS. 8-12 may be incorporated in those examples discussed with reference to FIGS. 1-7.

Figure 8:
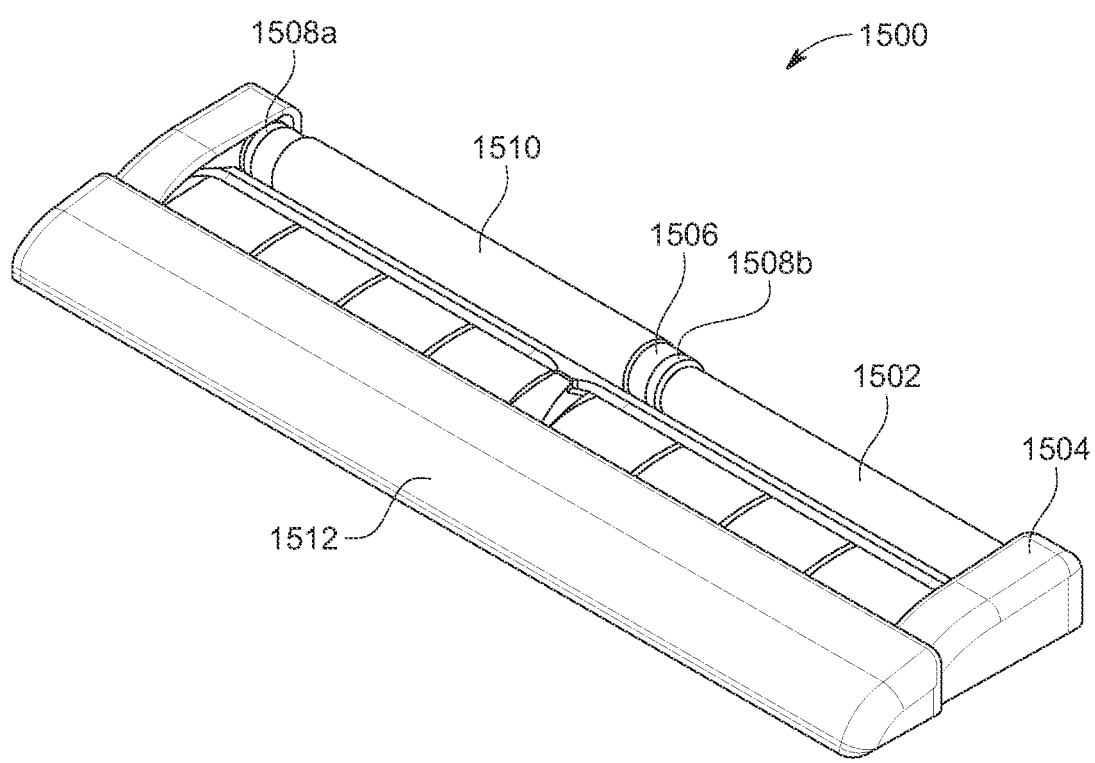
FIG. 8 illustrates another example of a pointing device system according to aspects of the present disclosure.
Figure 9:
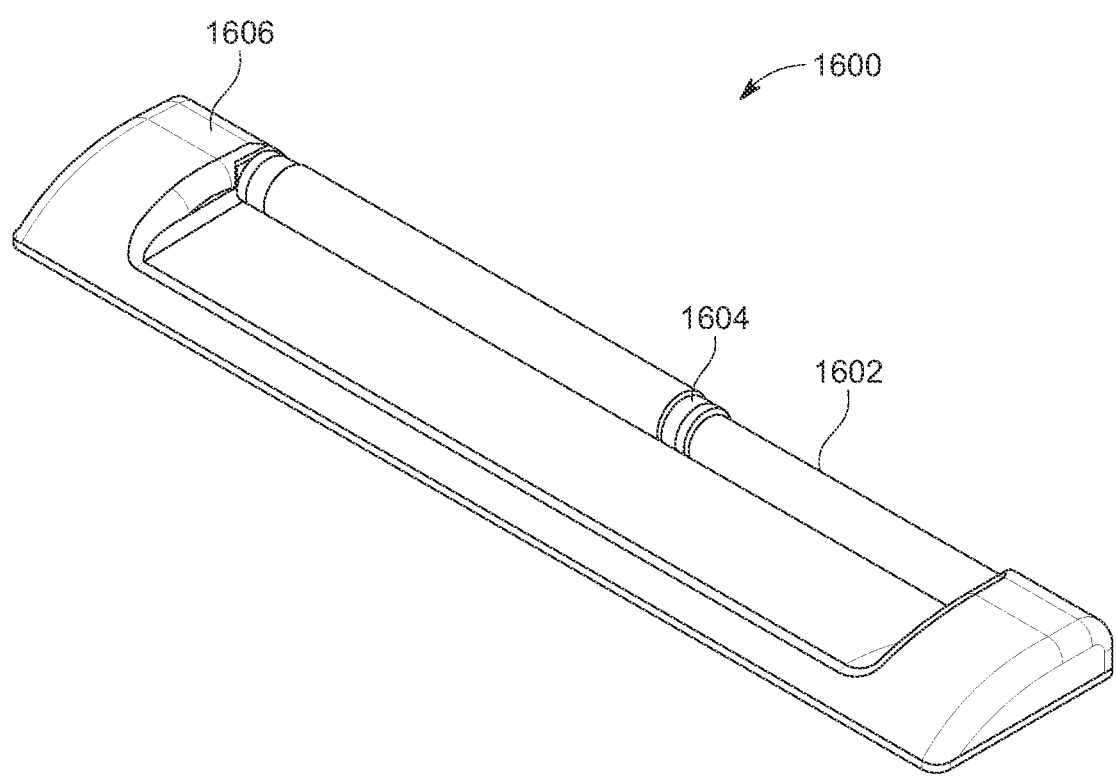
FIG. 9 illustrates a further example of a pointing device system according to aspects of the present disclosure.

For instance, referring to FIGS. 8 and 9, illustrated are other examples of an inner-sensor pointing device system in which the multiple optical sensors subsystem can be included. In FIG. 8, the pointing device system 1500 is shown as including an elongate base member 1502 and a device case 1504. The device case 1504 may contain additional parts, such as a circuit board, a click trigger, one or more switches, and a Piezoelectric device, among other components. As illustrated, the pointing device 1500 also includes a sleeve 1506 which fits over a portion of elongate base member 1502. Sleeve 1506 is rotatable about a portion of the elongate base member 1502, and is also slidable along a length of the elongate base member 1502. Similar to the sleeve 110 illustrated and discussed with reference to at least FIGS. 1 and 2, the sleeve 1506 is supported by bushings 1508*a* and 1508*b*, and may include a grip 1510 on an exterior surface. Also shown is a wrist support 1512.

FIG. 9 illustrates a pointing device system 1600 having a similar arrangement to that of the pointing device system 1500 shown in FIG. 8. In particular, FIG. 9 shows an elongate base member 1602, a sleeve 1604, and a device case 1606. The device case 1606 surrounds portions of additional components of the pointing device system 1600, such as a circuit board, one or more switches, and a Piezoelectric device, among other hardware, and protects those components from dust, dirt, moisture and the like. Different covers and different layouts may be implemented and may be adjusted based on the intended location of the pointing device system 1600 (e.g., a desktop, a remote computer terminal, etc.).

Figure 10:
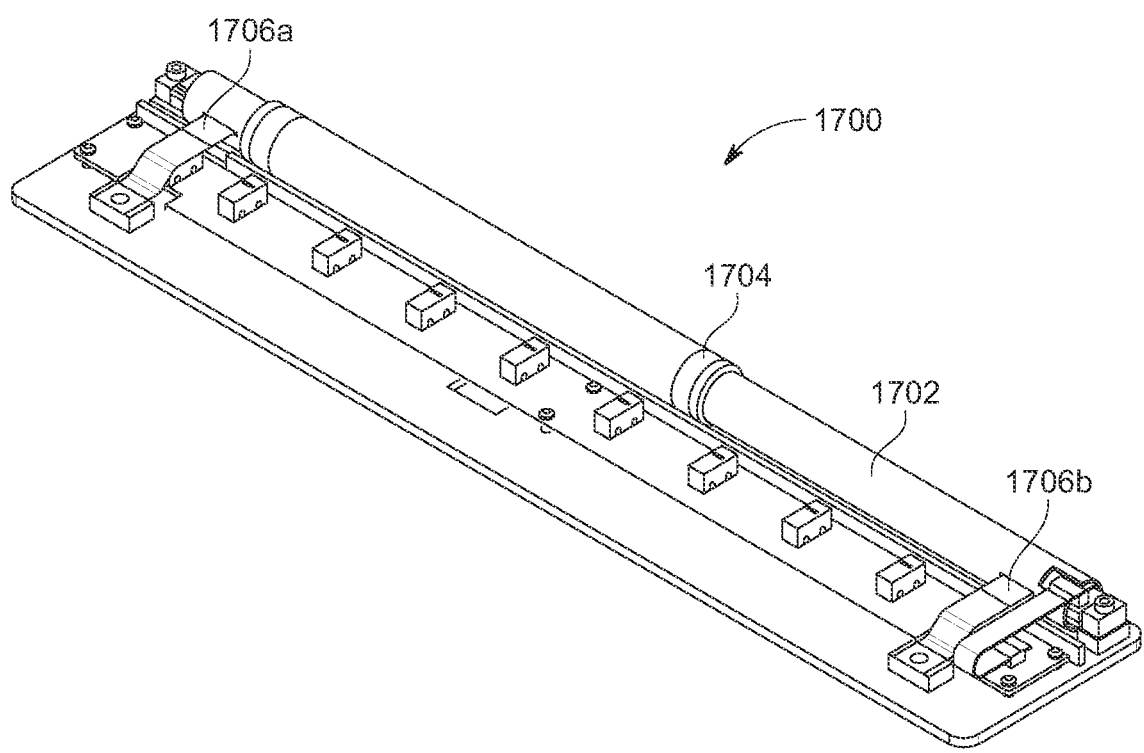
FIG. 10 illustrates a transparent view of an example pointing device system according to aspects of the present disclosure.

Referring now to FIG. 10, one example of a pointing device system support assembly that can be issued in any of the embodiments disclosed herein is illustrated. While in certain examples (not illustrated), a pair of brackets and a support rod may hold and suspend the elongate base member 1702 and sleeve 1704, in certain other embodiments other support assemblies may be used. For instance, in FIG. 10 a pair of leaf springs 1706*a* and 1706*b* is shown. The elongate base member 1702 and sleeve 1704 are supported by the leaf springs 1706*a* and 1706*b*, which are located proximate the ends of elongate base member 1702. While a pair of leaf springs is illustrated for the purpose of explanation, in certain examples the elongate base member 1702 may be supported by a single leaf spring positioned at one end of the elongate base member 1702. When a force is applied by the user in a generally downward direction on the sleeve 1704, the leaf springs 1706*a*, 1706*b* deflect allowing depression of the sleeve 1704 and elongate base member 1702. As discussed herein, in various examples the downward movement may activate a click trigger, which may be used, for example, to perform a drag and drop operation with the pointing device. In certain examples, tension of each leaf spring 1706*a*, 1706*b* may be adjusted to adjust the downward pressure which activates the click trigger.

Figure 11:
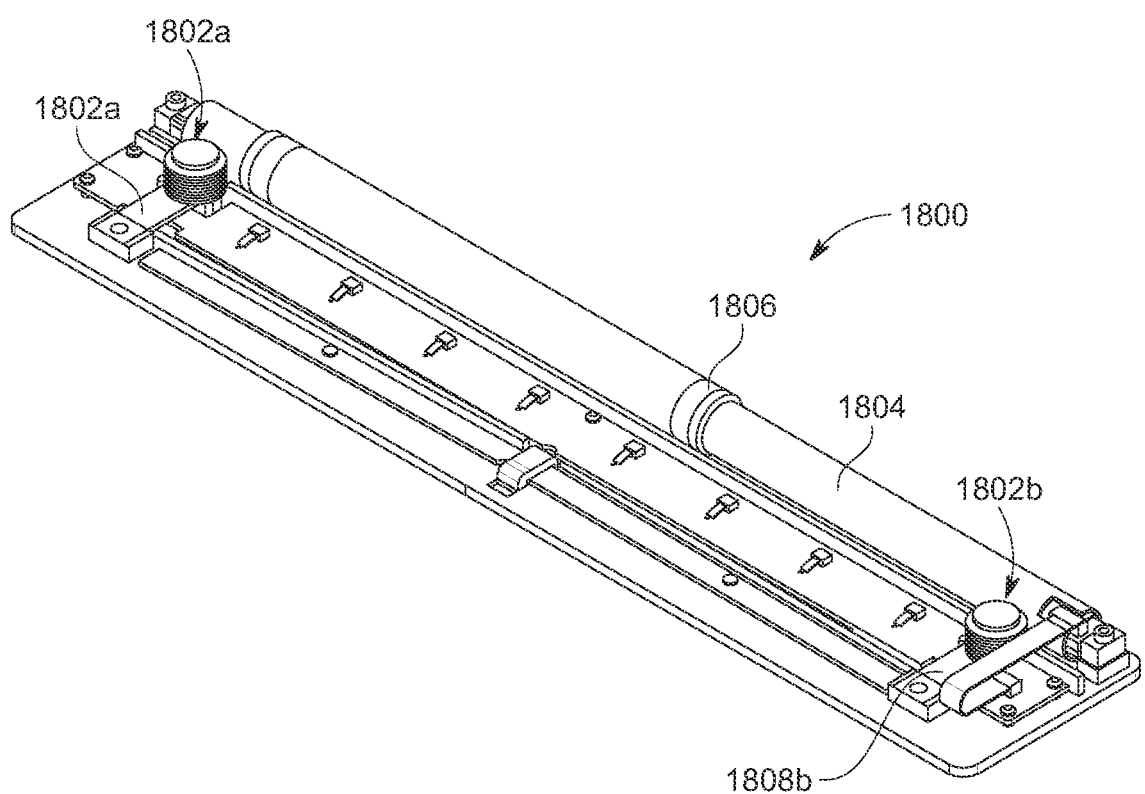
FIG. 11 illustrates a transparent view of another example pointing device system according to aspects of the present disclosure.

Referring now to FIG. 11, one example of a pointing device system 1800 that can include the multiple optical sensors subsystem and also incorporating a support assembly having a pair of solenoids 1802*a*, 1802*b* is shown. Each solenoid 1802*a*, 1802*b* include a respective plunger, coil, and plunger return spring. An elongate base member 1804 and sleeve 1806 are supported by solenoids 1802*a*, 1802*b*, which are located proximate the ends of elongate base member 1804 and are in mechanical communication with leaf springs 1808*a*, 1808*b*. When a force is applied by the user in a generally downward direction on the sleeve 1806, the solenoid plunger(s) deflect, as do leaf springs 1808*a*, 1808*b*, allowing depression of the sleeve 1806.

Figure 12:
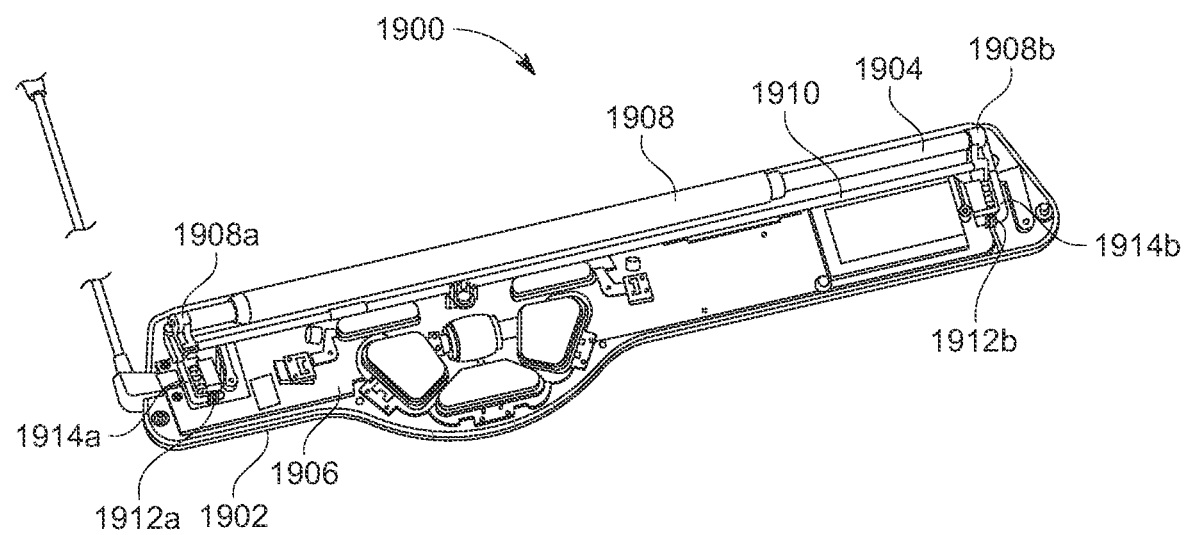
FIG. 12 illustrates a transparent view of a further example of a pointing device system according to aspects of the present invention.

Turning now to FIG. 12, a transparent view of another example of a pointing device system 1900 that can be modified to include the multiple optical sensors subsystem is illustrated. As shown, the pointing device system 1900 may include many of the same components as the other example pointing device systems described herein. For instance, the pointing device system 1900 may include a device case including a device base 1902, an elongate base member 1904, a circuit board 1906, a sleeve 1908, multiple optical sensors, and a click trigger, among other components.

FIG. 12 further shows another example of a support assembly which can be used to hold and suspend the elongate base member 1904 and the sleeve 1906. In particular, FIG. 12 shows a first support 1908*a* and a second support 1908*b* disposed at distal ends of the elongate base member 1904. Each support 1908*a*, 1908*b* is configured to receive the elongate base member 1904, and suspend the elongate base member 1904 and surrounding sleeve 1908 to permit depression thereof. The support system may also include a plurality of support rails 1910 interposed between the first and the second support 1908*a*. 1908*b*. In various examples, the support rails 1910 are disposed substantially adjacent an outer surface of the sleeve 1908. In a further example, the support rails 1910 can include one or more flexible hollow rods.

In various embodiments the device case includes a first pivot 1912*a* connected to the base 1902 of the device case, and a second pivot 1912*b* connected to the base 1902 of the device case. The first pivot 1912*a* may be configured to receive a first angular extension 1914*a* from the first support 1908*a*, and the second pivot 1912*b* may be configured to receive a second angular extension 1914*b* from the second support 1914*b*. Accordingly, the first angular extension 1914*a* and the second angular extension 1914*b* are configured to pivot about the first pivot 1912*a* and second pivot 1912*b*, respectively, in response to a downward pressure being applied to the elongate base member 1904 or sleeve 1906 relative to the base 1902 of the device. In various embodiments, the first and the second pivot 1912*a*, 1912*b* are substantially aligned so as to substantially align rotation of the first angular extension 1914*a* and second angular extension 1912*b* along an axis of rotation. As discussed in further detail herein, such a downward pressure can be used to initiate a click operation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A positioning device, comprising:
    an elongate base member;
    a sleeve disposed to fit over a portion of the elongate base member, the sleeve configured to rotate about the elongate base member in a first (Y) direction and slide about the elongate base member in a second (X) direction substantially orthogonal to the first direction; and
    at least two optical sensors disposed along a surface of the elongate base member and positioned to detect a position reading of the sleeve from at least one of a rotational movement of the sleeve relative to the multiple optical sensors and an axial movement of the sleeve relative to the at least two optical sensors, based at least in part on a variation of at least one signal received by the at least one of the at least two optical sensors signals from an inner surface of the sleeve within a field of view of at least one sensor of the at least two optical sensors; and
    wherein the position reading is based on a signal received by only one of the optical sensors.

2. The pointing device system of claim 1, wherein, during a first operation of the point device system, the position reading is based on a signal received by only a first one of the optical sensors and, during a second operation of the point device system, the position reading is based on a signal received by only a second one of the optical sensors, the first one of the optical sensors being different from the second one of the optical sensors.

3. The pointing device system of claim 1, wherein the position reading is based on a signal received from an optical sensor covered by the sleeve and the reading from an optical sensor not covered by the sleeve is ignored.

4. The pointing device system of claim 1, wherein the surface of the elongate base member is an inner surface, the two sensors are disposed along the inner surface and each sensor receives a signal from the inner surface of the sleeve through a respective aperture in the elongate base member.

5. The positioning device system of claim 1, wherein the positioning device is an improved roller mouse pointing device.

6. The pointing device system of claim 5, wherein the improved pointing device is smaller than a single optical sensor roller mouse pointing device.

7. The pointing device system of claim 5, further comprising a circuit in communication with the multiple optical sensors that is configured to transmit the detected position reading based on at least one of the rotational movement and the axial movement of the sleeve to a host computer.

8. The pointing device system of claim 7, wherein the circuit in communication with the multiple optical sensors communicates with a processor that is configured to effect motion of a pointer in a visual display relative to the detected position reading of at least one of the rotational movement and the axial movement of the sleeve.

9. The pointing device system of claim 5, wherein the improved pointing device has improved positioning accuracy than a single optical sensor roller mouse pointing device.

10. A method of determining position, comprising:
moving a sleeve disposed over a portion of the elongate base member, the sleeve configured to rotate about the elongate base member in a first (Y) direction and slide about the elongate base member in a second (X) direction substantially orthogonal to the first direction; and
receiving an optical signal from at least one optical sensor of at least two optical sensors disposed along a surface of the elongate base member from at least one of a rotational movement of the sleeve relative to the at least two optical sensors and axial movement of the sleeve relative to the at least two optical sensors, based at least in part on a variation of the optical signal received by the at least at least one of the at least two optical sensors signals from an inner surface of the sleeve within a field of view of at least one optical sensor of the at least two optical sensors to provide a position reading, wherein the position reading is based on a signal received by only one of the at least two optical sensors.

11. The method of determining position of claim 10, wherein, during a first instance of moving the sleeve, the position reading is based on a signal received by only a first one of the optical sensors and, during a second instance of moving the sleeve, the position reading is based on a signal received by only a second one of the optical sensors, the first one of the optical sensors being different from the second one of the optical sensors.

12. The method of determining position of claim 10, wherein the position reading is based on a signal received from an optical sensor covered by the sleeve and the reading from an optical sensor not covered by the sleeve is ignored.

13. The method of determining position of claim 10, wherein the position reading is processed to provide an improved roller mouse pointing device.

14. The method of determining position of claim 13, further comprising transmitting the position reading to a host computer to effect motion of a pointer in a visual display relative to the position reading of at least one of the rotational movement and the axial movement of the sleeve.

15. A positioning device, comprising:
an elongate base member;
a sleeve disposed to fit over a portion of the elongate base member, the sleeve configured to rotate about the elongate base member in a first (Y) direction and slide about the elongate base member in a second (X) direction substantially orthogonal to the first direction; and
at least two optical sensors disposed along a surface of the elongate base member and positioned to detect a position reading of the sleeve from at least one of a rotational movement of the sleeve relative to the multiple optical sensors and an axial movement of the sleeve relative to the at least two optical sensors, based at least in part on a variation of at least one signal received by the at least one of the at least two optical sensors signals from an inner surface of the sleeve within a field of view of at least one sensor of the at least two optical sensors; and
wherein the at least two optical sensors comprises two optical sensors and the position reading is either:
(i) based on an average of the signals from the two optical sensors;
(ii) selected from a higher quality of the signals from the two optical sensors; or
(iii) selected from the sensor that is more likely to be covered based on a determined direction of movement of the sleeve based on signals from the two optical sensors.

16. The pointing device system of claim 15, wherein, when the position reading is selected from the sensor that is more likely to be covered based on a determined direction of movement of the sleeve based on signals from the two optical sensors, the position reading is selected from a left sensor based on a determination that the sleeve is moving to the left based on signals from the two optical sensors.

17. The pointing device system of claim 15, wherein, when the position reading is selected from the sensor that is more likely to be covered based on a determined direction of movement of the sleeve based on signals from the two optical sensors, the position reading is selected from a right sensor based on a determination that the sleeve is moving to the right based on signals from the two optical sensors.

18. The positioning device system of claim 15, wherein the positioning device is an improved roller mouse pointing device.

19. A positioning device, comprising:
an elongate base member;
a sleeve disposed to fit over a portion of the elongate base member, the sleeve configured to rotate about the elongate base member in a first (Y) direction and slide about the elongate base member in a second (X) direction substantially orthogonal to the first direction; and at least two optical sensors disposed along a surface of the elongate base member and positioned to detect a position reading of the sleeve from at least one of a rotational movement of the sleeve relative to the multiple optical sensors and an axial movement of the sleeve relative to the at least two optical sensors, based at least in part on a variation of at least one signal received by the at least one of the at least two optical sensors signals from an inner surface of the sleeve within a field of view of at least one sensor of the at least two optical sensors; and wherein the at least two optical sensors comprises two optical sensors and the position reading is based on signals received from the two optical sensors, and wherein the length of the sleeve is at least 2 millimeters (mm) greater than a distance between an end-to-end spacing between the two optical sensors.

20. The pointing device system of claim 19, wherein the length of the sleeve is 10 centimeters (cm) and the distance between the sensors is 7 cm.

21. The positioning device system of claim 19, wherein the positioning device is an improved roller mouse pointing device.

22. A method of determining position, comprising:
moving a sleeve disposed over a portion of the elongate base member, the sleeve configured to rotate about the elongate base member in a first (Y) direction and slide about the elongate base member in a second (X) direction substantially orthogonal to the first direction; and receiving an optical signal from at least one optical sensor of at least two optical sensors disposed along a surface of the elongate base member from at least one of a rotational movement of the sleeve relative to the at least two optical sensors and axial movement of the sleeve relative to the at least two optical sensors, based at least in part on a variation of the optical signal received by the at least at least one of the at least two optical sensors signals from an inner surface of the sleeve within a field of view of at least one optical sensor of the at least two optical sensors to provide a position reading, and wherein the at least two optical sensors comprises two optical sensors and the position reading is either:

(i) based on an average of the signals from the two optical sensors;

(ii) selected from a higher quality of the signals from the two optical sensors; or (iii) selected from the sensor that is more likely to be covered based on a determined direction of movement of the sleeve based on signals from the two optical sensors.

23. The method of claim 22, wherein, when the position reading is selected from the sensor that is more likely to be covered based on a determined direction of movement of the sleeve based on signals from the two optical sensors, the position reading is selected from a left sensor based on a determination that the sleeve is moving to the left based on signals from the two optical sensors.

24. The method of claim 22, wherein, when the position reading is selected from the sensor that is more likely to be covered based on a determined direction of movement of the sleeve based on signals from the two optical sensors, the position reading is selected from a right sensor based on a determination that the sleeve is moving to the right based on signals from the two optical sensors.

25. The method of claim 22, wherein the position reading is processed to provide an improved roller mouse pointing device.

26. The method of claim 25, further comprising transmitting the position reading to a host computer to effect motion of a pointer in a visual display relative to the position reading of at least one of the rotational movement and the axial movement of the sleeve.

27. A method of determining position, comprising:
moving a sleeve disposed over a portion of the elongate base member, the sleeve configured to rotate about the elongate base member in a first (Y) direction and slide about the elongate base member in a second (X) direction substantially orthogonal to the first direction; and receiving an optical signal from at least one optical sensor of at least two optical sensors disposed along a surface of the elongate base member from at least one of a rotational movement of the sleeve relative to the at least two optical sensors and axial movement of the sleeve relative to the at least two optical sensors, based at least in part on a variation of the optical signal received by the at least at least one of the at least two optical sensors signals from an inner surface of the sleeve within a field of view of at least one optical sensor of the at least two optical sensors to provide a position reading, wherein the at least two optical sensors comprises two optical sensors and the position reading is based on signals received from the two optical sensors, and wherein the length of the sleeve is at least 2 millimeters (mm) greater than a distance between an end-to-end spacing between the two optical sensors.

28. The method of claim 27, wherein the position reading is processed to provide an improved roller mouse pointing device.

29. The method of claim 28, further comprising transmitting the position reading to a host computer to effect motion of a pointer in a visual display relative to the position reading of at least one of the rotational movement and the axial movement of the sleeve.

* * * * *